US009308994B2

(12) United States Patent
Uskert et al.

(10) Patent No.: US 9,308,994 B2
(45) Date of Patent: Apr. 12, 2016

(54) APPARATUS AND METHOD OF ATTACHMENT OF A PAYLOAD

(71) Applicant: AAI Corporation, Hunt Valley, MD (US)

(72) Inventors: Richard C. Uskert, Timonium, MD (US); Keith A. Lease, Hanover, PA (US)

(73) Assignee: AAI Corporation, Hunt Valley, MD (US)

( * ) Notice: Subject to any disclaimer, the term of this patent is extended or adjusted under 35 U.S.C. 154(b) by 136 days.

(21) Appl. No.: 14/191,508

(22) Filed: Feb. 27, 2014

(65) Prior Publication Data

US 2015/0239559 A1    Aug. 27, 2015

(51) Int. Cl.
| | |
|---|---|
| *B64D 7/08* | (2006.01) |
| *B64D 9/00* | (2006.01) |
| *B64C 39/02* | (2006.01) |
| *B64D 1/00* | (2006.01) |
| *E05C 1/14* | (2006.01) |

(52) U.S. Cl.
CPC . *B64D 7/08* (2013.01); *B64C 39/02* (2013.01); *B64D 1/00* (2013.01); *B64D 9/00* (2013.01); *E05C 1/14* (2013.01); *B64C 2201/128* (2013.01)

(58) Field of Classification Search
CPC .............. B64D 1/02; B64D 1/04; B64D 1/06; B64D 1/08; B64D 1/12; B64D 7/08; B64D 1/00; B64D 9/00; E05C 1/14; B64C 2201/128; B64C 39/02
See application file for complete search history.

(56) References Cited

U.S. PATENT DOCUMENTS

| | | | |
|---|---|---|---|
| 37,771 A | * | 2/1863 | Perley ...................... B64D 1/04 102/387 |
| 1,007,306 A | | 10/1911 | Nevins |
| 1,256,992 A | | 2/1918 | Edgar et al. |
| 1,508,192 A | * | 9/1924 | Lesh ........................ B64D 1/04 89/1.51 |
| 1,812,759 A | * | 6/1931 | Slinde ...................... B64D 1/04 89/1.58 |

(Continued)

FOREIGN PATENT DOCUMENTS

| | | |
|---|---|---|
| CA | 2855834 A1 | 5/2013 |
| CH | 203907 A | 4/1939 |

(Continued)

OTHER PUBLICATIONS

CN 103596732 english machine translation of specification and claims.*

(Continued)

*Primary Examiner* — Brian M O'Hara
*Assistant Examiner* — Alexander V Giczy
(74) *Attorney, Agent, or Firm* — BainwoodHuang

(57) ABSTRACT

An apparatus and method for attachment of a payload or store to the external surface of an aerial vehicle includes a single point release feature. The apparatus includes an elongated base having a first distal end and a second distal end. A retention receptacle including a hollow tube is disposed adjacent the first distal end and is configured to removably receive and retain the store or payload. In addition, a release receptacle housing a release mechanism assembly is disposed adjacent said second distal end. When the release mechanism assembly is in the closed and locked position, the store or payload is retained to the vehicle via a spring loaded lock pin advanced into the retention receptacle. When the release mechanism assembly is in the open and unlocked position, the store or payload may be disengaged from the vehicle.

9 Claims, 3 Drawing Sheets

(56) References Cited

U.S. PATENT DOCUMENTS

| | | | | |
|---|---|---|---|---|
| 2,350,140 | A * | 5/1944 | Wilton | B64D 1/04 124/7 |
| 2,365,409 | A * | 12/1944 | Hoffman | B64D 1/04 89/1.51 |
| 2,547,546 | A | 4/1951 | Stulpin et al. | |
| 2,623,437 | A * | 12/1952 | Foster | B64D 1/04 89/1.51 |
| 2,789,468 | A * | 4/1957 | Burns | B64D 1/04 294/82.26 |
| 3,132,889 | A * | 5/1964 | Damm | B64D 1/06 24/603 |
| 3,751,949 | A | 8/1973 | Castle | |
| 4,416,437 | A * | 11/1983 | Hasquenoph | B64D 7/08 244/137.4 |
| 4,441,674 | A * | 4/1984 | Holtrop | B64D 1/06 244/137.4 |
| 4,523,731 | A * | 6/1985 | Buitekant | B64D 1/02 24/453 |
| 4,922,799 | A * | 5/1990 | Bartl | B64D 1/06 244/137.4 |
| 5,779,190 | A | 7/1998 | Rambo et al. | |
| 5,975,464 | A | 11/1999 | Rutan | |
| 6,622,605 | B1 * | 9/2003 | Snell | B64D 1/06 294/82.33 |
| 7,083,148 | B2 * | 8/2006 | Bajuyo | B64D 1/04 244/137.4 |
| 7,192,229 | B2 | 3/2007 | Retat et al. | |
| 8,127,655 | B1 * | 3/2012 | Kay | B64D 1/06 89/1.54 |
| 8,469,435 | B2 | 6/2013 | Ruffino et al. | |

FOREIGN PATENT DOCUMENTS

| | | |
|---|---|---|
| CN | 103596732 A | 2/2014 |
| EP | 2236712 A2 | 10/2010 |
| FR | 1119286 A | 6/1956 |
| FR | 1235508 A | 7/1960 |
| GB | 397602 A | 8/1933 |
| GB | 514536 A | 11/1939 |
| GB | 616756 A | 1/1949 |
| WO | 2009141371 A1 | 11/2009 |

OTHER PUBLICATIONS

International Search Report for International Application No. PCT/US2015/017984 mailed from the International Searching Authority on May 20, 2015, 14 pages.

* cited by examiner

APPARATUS AND METHOD OF ATTACHMENT OF A PAYLOAD

OVERVIEW OF INVENTION

1. Technical Field

The present disclosure relates generally to apparatus, systems and methods for attachment of an object to a hard point on an vehicle. In particular, the present disclosure relates to apparatus, systems and methods for attachment of an external payload or store to a hard point on an air vehicle, such as an Unmanned Aerial Vehicle (UAV).

2. Background

The current art exists for attachment of an external payload to a hard point of a vehicle, specifically, a UAV, that consists of a multi-screw pattern on the payload which matches up with the same screw pattern on the hard point of the UAV. The screw pattern of the external payload, with the aid of alignment pins, is brought into alignment with the screw pattern on the UAV hard point, and the screws are tightened to a predetermined torque in order to mount the payload to an external surface of a UAV. This method requires aligning and holding the payload in a fixed location while the screws are tightened. Additionally, typically, the attachment screws are threaded into locking helicoils which are designed to prevent the hardware from loosening and backing out during flight. These helicoils may only be used for a limited number of cycles and must be regularly replaced.

Therefore, an improved method of attaching an external payload to a surface of an aerial vehicle is needed that can easily be incorporated into the structure of the aerial vehicle, that allows for quick and easy upload and download of a payload.

DETAILED DESCRIPTION OF INVENTION

Embodiments in accordance with the present disclosure are set forth in the following text to provide a thorough understanding and enabling description of a number of particular embodiments. Numerous specific details of various embodiments are described below with reference to attachment of payloads to an aerial vehicle, but embodiments can be used with other features. In some instances, well-known structures or operations are not shown, or are not described in detail to avoid obscuring aspects of the inventive subject matter associated with the accompanying disclosure. A person skilled in the art will understand, however, that the invention may have additional embodiments, or that the invention may be practiced without one or more of the specific details of the embodiments as shown and described.

Figure 1:
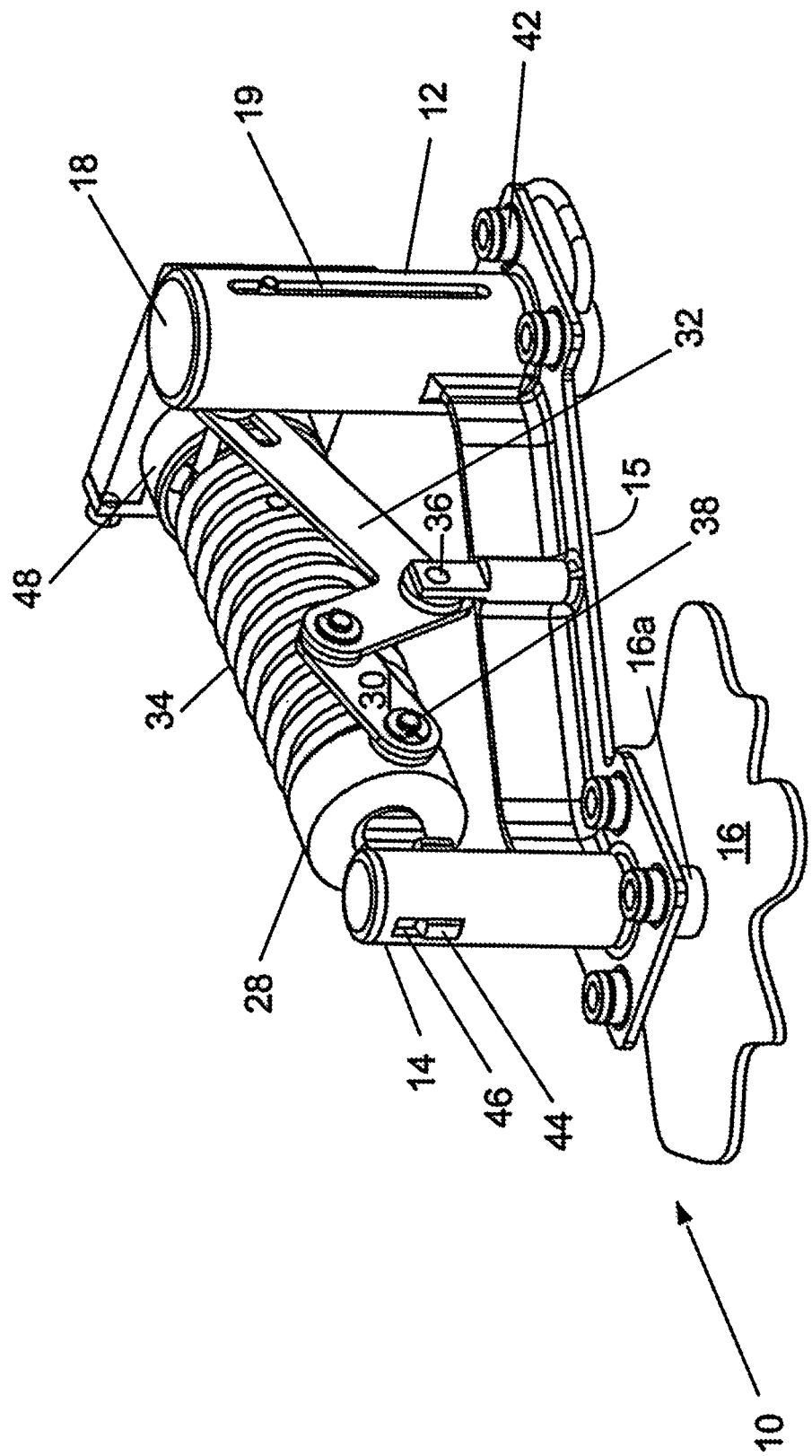
FIG. 1 is an iso-metric view showing an embodiment of the attachment apparatus.
Figure 2:
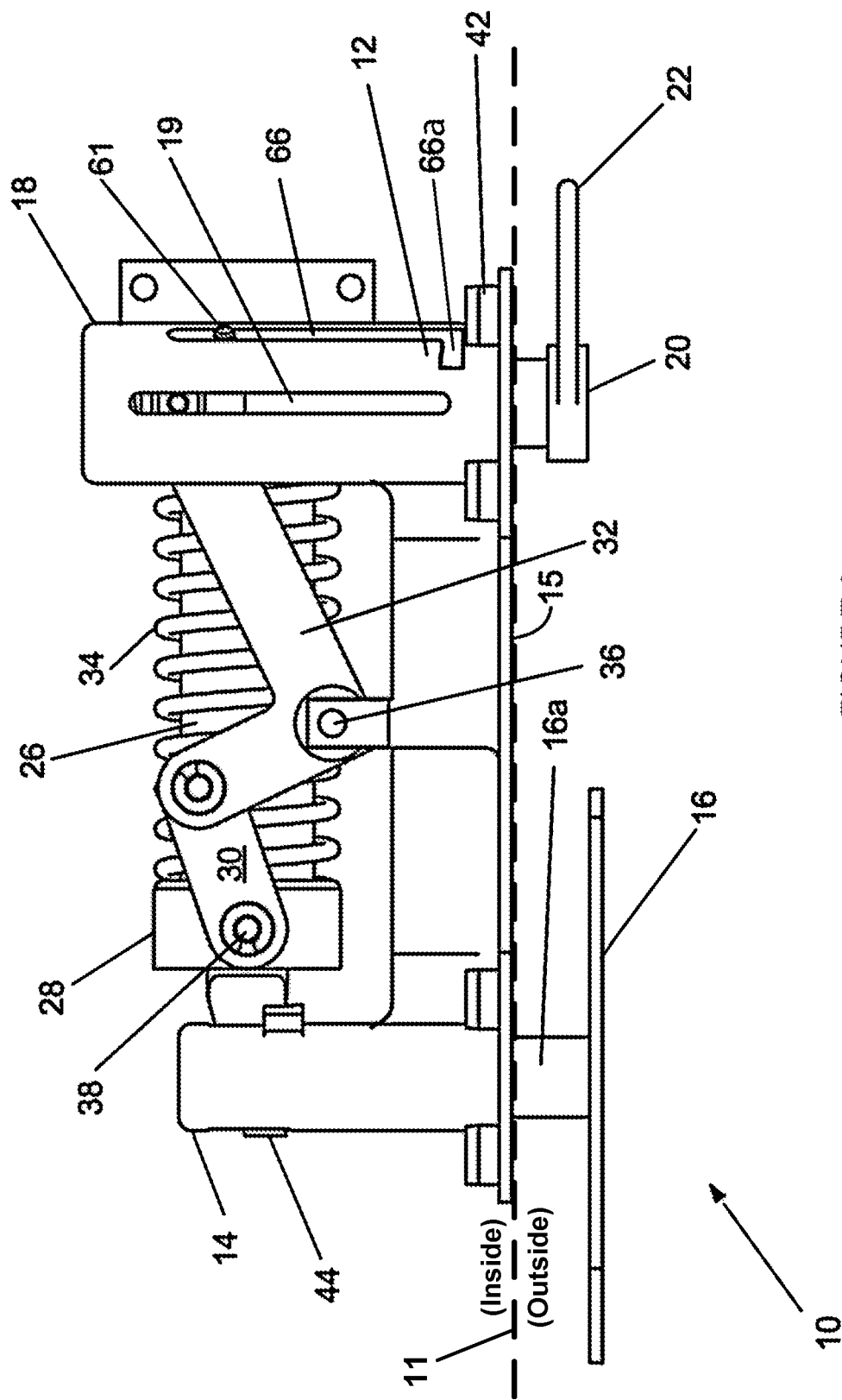
FIG. 2 is a side plan view showing an embodiment of the attachment apparatus.
Figure 3:
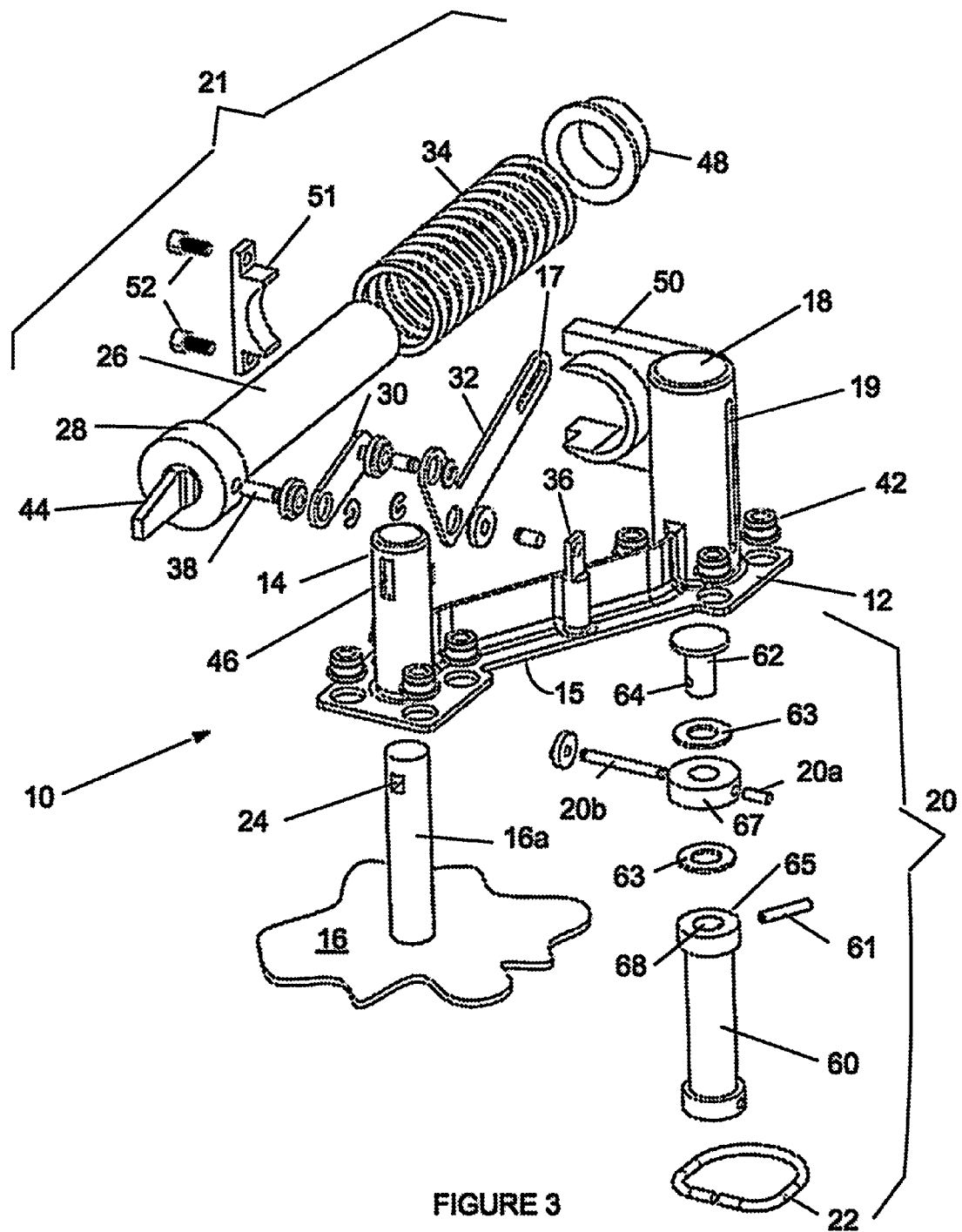
FIG. 3 is an exploded view showing an embodiment of the attachment apparatus.

Referring to FIGS. 1, 2, and 3 which depicts a store/payload attachment device 10. Typically, the attachment device 10 would be mounted by a plurality of threaded retainers 42 or the like to the inside structure or skin 11 of the vehicle. The attachment device 10 is comprised of a housing 12 which includes an elongated base 15 and located at a first distal end of the base 15 is a retention receptacle 14 and disposed at the other distal end of the base 15 is a release receptacle 18. The retention receptacle 14 is a tubular like structure that is sized to receive a payload pin 16a which is protruding upwardly from the surface of a payload 16. A slot 24 is disposed on the payload pin 16a which is configured to align with an opening 46 disposed on the receptacle 14 when the pin 16a is fully inserted up into the receptacle 14.

The release receptacle 18 is a tubular like structure that is configured to slidably receive and retain a release mechanism assembly 20. An elongated slot 19 disposed in the receptacle 18 is configured to engage pins 20a and 20b protruding from the release mechanism assembly 20 to guide the motion of the release mechanism 20 when it is moved in an up and down like motion. A d-ring 22 is disposed at a lower distal end of the release mechanism 20 which allows a person to grab onto and pull down on the release mechanism 20.

Release mechanism 20 consists of shaft 60 possessing a hole to receive D-ring 22 at the lower distal end and hole 68 to receive pin 62 at the upper distal end. Pin 61 slidably engages shaft 60 through hole 65 and fixedly engages pin 62 through hole 64. Bushings 63 and collar 67 are rotably engaged by pin 62 and slidably constrained by the collar of shaft 68 and the head of pin 62. The diameters of pin 62, collar 67 and collar of shaft 60 are of such size that they slidably and rotably engage the inner surface of receptacle 18.

An elongated slot 66 disposed in the receptacle 18 is configured to engage pin 61 protruding from the release mechanism assembly 20. Slot 66 possesses a "J" configuration such that shaft 60 with pin 61 slidably engaged in slot 66 may be rotated and pin 61 received into the short leg 66a of slot 66's "J" so as to hold release mechanism assembly in an "open" position. Twisting and releasing shaft 60 will cause the release mechanism assembly 20 to retract through the force provided by the spring 34.

A spring loaded locking pin assembly 21 is disposed between the retention receptacle 14 and the release receptacle 18 and is comprised of a lock pin 26 having a tapered end 44 and a collar 28 disposed on one distal end. A spring 34 is disposed around the lock pin 26 and abuts the collar 28 to provide a locking biasing force. A bushing 48 is disposed at the other distal end of the lock pin 26 and is configured to slidably engage the lock pin as it is moved between a locked and unlocked position. The bushing 48 engages clevis 50 on the release receptacle 18. Bushing 48 is captured by cap 51, which is attached to clevis 50 by screws 51.

An L-shaped bellcrank link 32 is pivotably attached to the base 15 at first pivot 36. Disposed at one distal end of the link 32 is an elongated slot 17 which is configured to interface with a pin 20b which protrudes from release mechanism 20 such that when the release mechanism 20 is pulled in a downward direction, the link 32 rotates about the first pivot 36. A first link 30 is pivotably disposed between link 32 and extends to the collar 28 at a second pivot 38 such that when the link 32 rotates in a clockwise direction, the lock pin 26 slidably retracts from the retention receptacle 14. With this arrangement, pulling down on the d-ring 22 will rotate the link 32 which will pull the lock pin 26 tapered end 44 out of the retention receptacle 14 and either allows the payload pin 16a to be removed from or inserted into the retention receptacle 14.

The spring 34 is configured to force the tapered end 44 through the an opening in the retention receptacle 14 and through the slot 24 in the pin 16a and into the opening 44 such that the wedge like action of the tapered surfaces positively retains the payload 16 with no clearance or slop.

The invention claimed is:

1. An apparatus for removable retention of a store or payload to a vehicle, comprising:

an elongated base having a first distal end and a second distal end;

a retention receptacle disposed adjacent said first distal end, said retention receptacle configured to removably receive and retain the store or payload;

a release receptacle disposed adjacent said second distal end, said release receptacle housing a release mechanism assembly;

said release mechanism assembly configured to move between a closed and locked position and an opened and unlocked position, wherein when the release mechanism assembly is in said closed and locked position the store or payload is retained to the vehicle, and wherein when the release mechanism assembly is in said open and unlocked position the store or payload may be disengaged from the vehicle; and a spring loaded lock pin configured to advance into the retention receptacle when said release mechanism assembly is in said closed and locked position, wherein the retention receptacle includes a hollow tube having an opening in a wall thereof through which the spring loaded lock pin is advanced when said release mechanism assembly is in said closed and locked position.

2. The apparatus of claim 1, further comprising:

a bellcrank link having a first end and a second end and a fixed pivot disposed between said first end and said second end, wherein said second end of said bellcrank link is affixed to said release mechanism assembly;

a first link attached between said first end of said bellcrank link and said lock pin, wherein when said release mechanism assembly is moved to said unlocked and open position, said bellcrank link is configured to rotate about said fixed pivot and cause said lock pin to retract from said retention receptacle.

3. The apparatus of claim 2, further comprising:

an elongated slot disposed in said release receptacle, said elongated slot configured to receive and guide a pin protruding from a shaft slidably disposed in said release receptacle, wherein said elongated slot is configured to retain said release mechanism assembly in said open and unlocked position.

4. The apparatus of claim 1, wherein the release receptacle includes a second hollow tube, and wherein the release mechanism assembly is configured to move axially within the second hollow tube between the closed and locked position and the open and unlocked position.

5. The apparatus of claim 1, wherein the release mechanism assembly has a ring disposed outside the second hollow tube, and wherein axial movement of the release mechanism assembly between the closed and locked position and the open and unlocked position is effected by pulling on the ring.

6. A method for removable retention of a store or payload to a vehicle, comprising the steps of:

providing an elongated base having a first distal end and a second distal end;

providing a retention receptacle disposed adjacent said first distal end, said retention receptacle configured to removably receive and retain the store or payload; and providing a release receptacle disposed adjacent said second distal end, said release receptacle housing a release mechanism assembly, said release mechanism assembly configured to move between a closed and locked position and an opened and unlocked position, wherein when the release mechanism assembly is in said closed and locked position the store or payload is retained to the vehicle, and wherein when the release mechanism assembly is in said open and unlocked position the store or payload may be disengaged from the vehicle; and providing a spring loaded lock pin configured to advance into the retention receptacle when said release mechanism assembly is in said closed and locked position, wherein the retention receptacle includes a hollow tube having an opening in a wall thereof through which the spring loaded lock pin is advanced when said release mechanism assembly is in said closed and locked position.

7. The method of claim 6, further comprising the steps of:

providing a bellcrank link having a first end and a second end and a fixed pivot disposed between said first end and said second end, wherein said second end of said bellcrank link is affixed to said release mechanism assembly;

providing a first link attached between said first end of said bellcrank link and said lock pin, wherein when said release mechanism assembly is moved to said unlocked and open position, said bellcrank link is configured to rotate about said fixed pivot and cause said lock pin to retract from said retention receptacle.

8. The method of claim 7, further comprising the steps of:

providing an elongated slot disposed in said release receptacle, said elongated slot configured to receive and guide a pin protruding from a shaft slidably disposed in said release receptacle, wherein said elongated slot is configured to retain said release mechanism assembly in said open and unlocked position.

9. A UAV (Unmanned Aerial Vehicle), comprising:

a skin defining a boundary between an inside of the UAV and an outside the UAV;

an elongated base disposed on the inside of the UAV, the elongated base having a first distal end and a second distal end;

a retention receptacle disposed adjacent said first distal end, said retention receptacle having a hollow, tubular shape and having an opening in a wall thereof;

a release receptacle disposed adjacent said second distal end, said release receptacle having a hollow, tubular shape and housing a release mechanism assembly therein; and a lock pin, coupled to the release mechanism assembly at the second distal end, wherein said release mechanism assembly is constructed and arranged to move axially within the release receptacle between a first position and a second position, wherein said lock pin is constructed and arranged to advance into the retention receptacle through the opening in the wall thereof in response to movement of the release mechanism assembly from the first position to the second position, and wherein said lock pin is constructed and arranged to retract from the retention receptacle in response to movement of the release mechanism assembly from the second position to the first position.

* * * * *